US012600040B2

(12) United States Patent
Yamazaki

(10) Patent No.: US 12,600,040 B2
(45) Date of Patent: Apr. 14, 2026

(54) SIMULATION DEVICE USING THREE-DIMENSIONAL POSITION INFORMATION OBTAINED FROM OUTPUT FROM VISION SENSOR

(71) Applicant: FANUC CORPORATION, Yamanashi (JP)

(72) Inventor: Takashi Yamazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 193 days.

(21) Appl. No.: 18/261,111

(22) PCT Filed: Feb. 18, 2022

(86) PCT No.: PCT/JP2022/006772
§ 371 (c)(1),
(2) Date: Jul. 12, 2023

(87) PCT Pub. No.: WO2022/181500
PCT Pub. Date: Sep. 1, 2022

(65) Prior Publication Data
US 2024/0066701 A1 Feb. 29, 2024

(30) Foreign Application Priority Data
Feb. 25, 2021 (JP) ................................. 2021-029119

(51) Int. Cl.
*B25J 9/16* (2006.01)
*G05B 19/4155* (2006.01)
(52) U.S. Cl.
CPC ........... *B25J 9/1671* (2013.01); *B25J 9/1697* (2013.01); *G05B 19/4155* (2013.01); *G05B 2219/40311* (2013.01)

(58) Field of Classification Search
CPC ...... B25J 9/1671; B25J 9/1697; B25J 9/1656; B25J 9/1664; B25J 9/1605; B25J 9/1692;
(Continued)

(56) References Cited

U.S. PATENT DOCUMENTS 11,691,287 B2 * 7/2023 Yoneyama ............. B25J 9/1653
700/245
2003/0090483 A1 * 5/2003 Watanabe .............. B25J 9/1671
345/419
(Continued)

FOREIGN PATENT DOCUMENTS

CN 101493682 A 7/2009
CN 104802173 A 7/2015
(Continued)

OTHER PUBLICATIONS

"Operating Manual RobotStudio 5.13", 2010 (Year: 2010) (Year: 2010).*

*Primary Examiner* — Adam R Mott
*Assistant Examiner* — James Miller Watts, III
(74) *Attorney, Agent, or Firm* — HAUPTMAN HAM, LLP

(57) ABSTRACT
This simulation device comprises a simulation implementation unit that simulates a movement of a robot device, and estimates a movement path of a robot. The simulation device comprises a position information generation unit that generates three-dimensional position information for a surface of a workpiece on the basis of the output of a vision sensor, which has imaged an actual workpiece. A display unit displays the three-dimensional position information for the surface of the workpiece, superimposed on an image of a robot device model, an image of a workpiece model, and the movement path of the robot.

6 Claims, 10 Drawing Sheets

(58) Field of Classification Search
CPC ...... G05B 19/4155; G05B 2219/40311; G05B
2219/39102; G05B 2219/40515; G05B
2219/40519; G05B 19/42
See application file for complete search history.

(56) References Cited

U.S. PATENT DOCUMENTS

| | | | |
|---|---|---|---|
| 2004/0172168 A1* | 9/2004 | Watanabe ............ | G05B 19/425 |
| | | | 700/264 |
| 2006/0025890 A1* | 2/2006 | Nagatsuka ............. | B25J 9/1666 |
| | | | 700/253 |
| 2010/0262288 A1* | 10/2010 | Svensson ............... | B25J 9/1671 |
| | | | 700/254 |
| 2019/0258225 A1* | 8/2019 | Link ......................... | G06T 7/70 |

FOREIGN PATENT DOCUMENTS

| | | | |
|---|---|---|---|
| CN | 110170982 | A | 8/2019 |
| CN | 112276936 | A | 1/2021 |
| JP | H07-084631 | A | 3/1995 |
| JP | H11-239989 | A | 9/1999 |
| JP | 2003-150219 | A | 5/2003 |
| JP | 2004-243516 | A | 9/2004 |
| JP | 2004-255547 | A | 9/2004 |
| JP | 2006-035384 | A | 2/2006 |
| JP | 2015-093345 | A | 5/2015 |
| JP | 2018-144160 | A | 9/2018 |
| JP | 2019-113336 | A | 7/2019 |

* cited by examiner

SIMULATION DEVICE USING THREE-DIMENSIONAL POSITION INFORMATION OBTAINED FROM OUTPUT FROM VISION SENSOR

RELATED APPLICATIONS

The present application is a National Phase of International Application No. PCT/JP2022/006772 filed Feb. 18, 2022, which claims priority to Japanese Application No. 2021-029119 filed Feb. 25, 2021.

TECHNICAL FIELD

The present invention relates to a simulation device using three-dimensional position information obtained from an output of a vision sensor.

BACKGROUND ART

For a robot device including a robot and an operation tool, a position and an orientation of the operation tool are changed by changing a position and an orientation of the robot. The robot device can perform various operations for which the position and the orientation of the operation tool are changed. The position and the orientation of the robot are changed in accordance with an operation program generated before performing operation. In the operation program, a teaching point is set at which the position and the orientation of the robot are defined.

When the robot device performs a new operation, an operation program needs to be created. The position of the robot and the orientation of the robot at a teaching point can be taught by driving an actual robot. There is a known simulation device that simulates an operation of a robot device (e.g., Japanese Unexamined Patent Publication No. 2015-93345A). In the simulation device, the operation of the robot device can be confirmed using an image. An operator can teach a teaching point by simulating the operation of the robot device using the simulation device.

In the related art, it is known that a three-dimensional vision sensor is attached to a robot and position information acquired by the three-dimensional vision sensor is processed so as to detect a position of an object with respect to a robot and perform various operations (e.g., Japanese Unexamined Patent Publication No. 2006-35384A).

There is a known control in which a two-dimensional vision sensor or a three-dimensional vision sensor is attached to a robot and a teaching point is corrected by actually driving a robot device (e.g., Japanese Unexamined Patent Publication No. 7-84631A and Japanese Unexamined Patent Publication No. 2004-255547A). In such a device, for example, a marker is put on an actual workpiece. A position of the marker on the actual workpiece is acquired based on an output of the vision sensor. A position of the teaching point in an operation program can be corrected based on the position of the actual marker.

CITATION LIST

Patent Literature

[PTL 1] Japanese Unexamined Patent Publication No. 2015-93345A
[PTL 2] Japanese Unexamined Patent Publication No. 2006-35384A

[PTL 3] Japanese Unexamined Patent Publication No. 7-84631A
[PTL 4] Japanese Unexamined Patent Publication No. 2004-255547A

SUMMARY OF INVENTION

Technical Problem

For a simulation device, it is preferable to determine an exact position and an exact orientation of a robot with respect to a workpiece on which an operation is to be performed. However, an installation position at which a robot device is installed on an installation surface and an installation position of a peripheral device such as a platform supporting a workpiece are less likely to be exactly set in accordance with desired design values. In particular, deviation of the installation position of the peripheral device correlates with deviation of a position at which the workpiece is arranged. In many cases, the installation position of the actual robot and the position at which the actual workpiece is arranged deviate from corresponding positions in a simulation. Thus, a position of a teaching point and the orientation of the robot at the teaching point are preferably also shifted.

In the related art, an operation program created by a simulation device is input to a controller of an actual robot device. An operator actually drives a robot so as to correct a position of a teaching point and an orientation of the robot at the teaching point in the operation program.

On the other hand, in the simulation device, it is difficult to adjust the position of the teaching point and the orientation of the robot at the teaching point in consideration of the installation position of the actual robot and the position at which the actual workpiece is arranged. In other words, there is a problem in that it is difficult to predict how the installation position of the robot or the installation position of the peripheral device to which the workpiece is fixed deviate, and it is difficult to correct the operation program in the simulation device.

In a control in which a marker is put on a surface of the actual workpiece and a position of the marker is detected by a vision sensor, there is a problem in that the position of the marker set on the workpiece in the simulation needs to be matched with the position of the marker set on the actual workpiece. When detection of the marker fails, the position of the workpiece cannot be determined. For this reason, it is necessary to create the marker so that the workpiece can be easily detected based on the output of the vision sensor.

Solution to Problem

A simulation device according to a first aspect of the present disclosure performs a simulation of an operation of a robot device including a robot. The simulation device includes a model generating unit that generates a robot device model and a workpiece model for a simulation based on three-dimensional shape data of the robot device and three-dimensional shape data of the workpiece. The simulation device includes a display part that displays an image of the robot device model and an image of the workpiece model. The simulation device includes an operation information setting unit that generates an operation program including a teaching point. The simulation device includes a simulation executing unit that performs the simulation of the operation of the robot device based on the teaching point to estimate an operation path of the robot. The simulation device includes a position information generating unit that generates three-dimensional position information on a surface of the workpiece based on an output of a vision sensor that has imaged the actual workpiece. The display part displays the three-dimensional position information on the surface of the workpiece that is superimposed on the image of the robot device model, the image of the workpiece model, and the operation path of the robot.

A simulation device according to a second aspect of the present disclosure performs a simulation of an operation of a robot device including a robot. The simulation device includes a model generating unit that generates a robot device model and a workpiece model for a simulation based on three-dimensional shape data of the robot device and three-dimensional shape data of the workpiece. The simulation device includes a simulation executing unit that performs the simulation of the operation of the robot device. The simulation device includes an operation information setting unit that sets operation information defined in an operation program based on the simulation of the operation of the robot device. The simulation device includes a position information generating unit that generates three-dimensional position information on a surface of the workpiece based on an output of a vision sensor that has imaged the actual workpiece, and a position detecting unit that detects a position of the actual workpiece by matching reference data of the workpiece with the three-dimensional position information on the surface of the workpiece. The operation information setting unit corrects the operation information included in the operation program so as to correspond to the position of the actual workpiece, based on a position of the workpiece model in the simulation and the position of the actual workpiece detected by the position detecting unit.

Advantageous Effect of Invention

According to an aspect of the present disclosure, it is possible to provide a simulation device that can easily determine or correct deviation of a position and an orientation of a robot.

BRIEF DESCRIPTION OF DRAWINGS

FIG. 2 is a block diagram of a first robot system including the first robot device and a first simulation device according to the embodiment.

FIG. 7 is a block diagram of a second robot system including the first robot device and a second simulation device according to an embodiment.

DESCRIPTION OF EMBODIMENTS

A simulation device according to an embodiment will be described with reference to FIGS. 1 to 10. The simulation device according to the present embodiment simulates an operation of a robot device including a robot. The simulation device according to the present embodiment processes an output of a three-dimensional vision sensor. The three-dimensional vision sensor acquires information relating to a surface of a workpiece serving as an operation object. The simulation device according to the present embodiment displays position information on the surface of the workpiece together with a model for a simulation, and corrects a teaching point determined in the simulation based on the position information on the surface of the workpiece.

Figure 1:
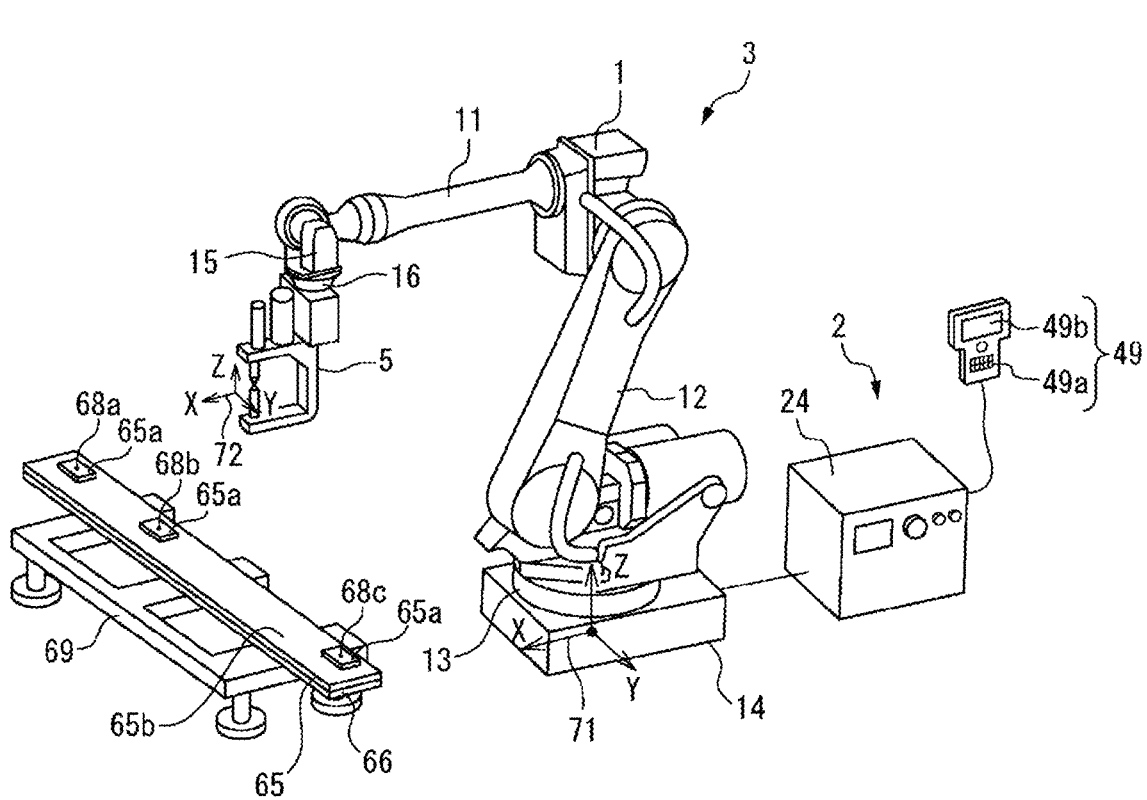
FIG. 1 is a perspective view of a first robot device according to an embodiment.
Figure 2:
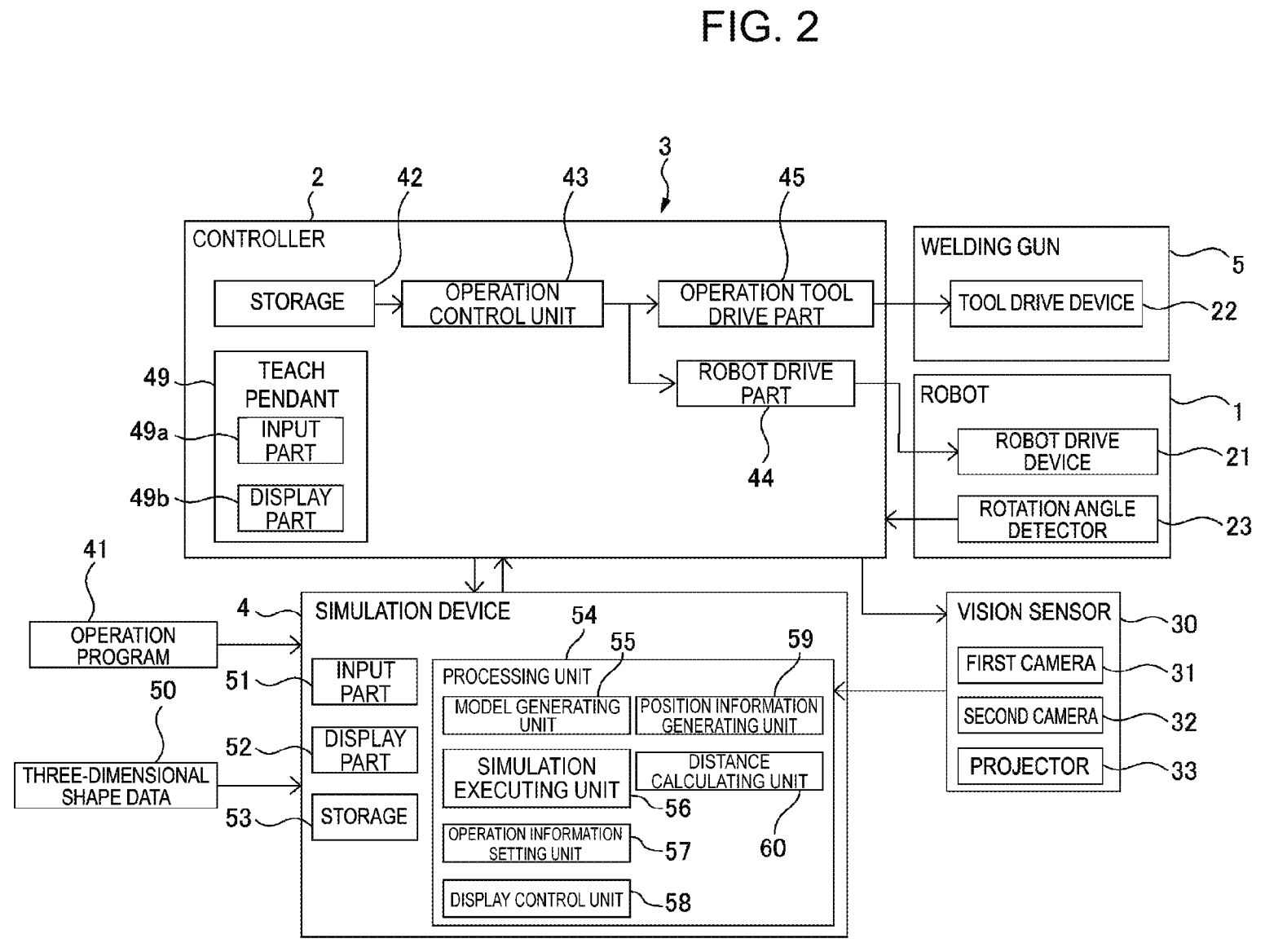

FIG. 1 is a perspective view of a first robot device according to the present embodiment. FIG. 2 is a block diagram of a first robot system according to the present embodiment. Referring to FIGS. 1 and 2, the first robot system includes a first robot device 3 and a first simulation device 4. The first robot device 3 performs spot welding. The first robot device 3 includes a welding gun 5 as an operation tool, and a robot 1 that changes a position and an orientation of the welding gun 5. The robot device 3 includes a controller 2 that controls the robot 1 and the welding gun 5. The first robot system includes a vision sensor 30 that acquires information relating to a surface of a workpiece 65 serving as an object for the operation.

The first workpiece 65 according to the present embodiment is a plate-like member. The first workpiece 65 includes protrusions 65*a* formed in correspondence with welding points 68*a* to 68*c*. The first workpiece 65 has a surface 65*b*. A second workpiece 66 is a plate-like member having the same planar shape as the first workpiece 65. The robot device 3 performs spot welding at the three welding points 68*a* to 68*c*. The first workpiece 65 and the second workpiece 66 are fixed to each other. The workpieces 65 and 66 are supported by a platform 69.

The robot 1 according to the present embodiment is an articulated robot including a plurality of joints. The robot 1 includes an upper arm 11 and a lower arm 12. The lower arm 12 is supported by a turning base 13. The turning base 13 is supported by a base 14. The robot 1 includes a wrist 15 that is coupled to an end portion of the upper arm 11. The wrist 15 includes a flange 16 that fixes the welding gun 5. The robot 1 according to the present embodiment includes six drive axes, but is not limited to this configuration. Any robot that can move the operation tool can be employed.

The robot 1 of the present embodiment includes a robot drive device 21 that drives constituent members, such as the upper arm 11. The robot drive device 21 includes a plurality of drive motors for driving the upper arm 11, the lower arm 12, the turning base 13, and the wrist 15. The welding gun 5 includes a tool drive device 22 that drives the welding gun 5. The tool drive device 22 according to the present embodiment includes a motor that drives a movable electrode with respect to a fixed electrode of the welding gun 5.

The controller 2 includes an arithmetic processing device 24 (computer) including a central processing unit (CPU) serving as a processor. The arithmetic processing device 24 includes a random access memory (RAM) and a read only memory (ROM), which are mutually connected to the CPU via a bus. The robot device 3 drives the robot 1 and the welding gun 5 in accordance with an operation program created in advance. The robot device 3 according to the present embodiment automatically performs spot welding on the workpieces 65 and 66 at the welding points 68*a* to 68*c*.

The arithmetic processing device 24 of the controller 2 includes a storage 42 that stores information relating to a control of the robot device 3. The storage 42 can include a non-transitory storage medium that can store information. For example, the storage 42 can include a storage medium, such as a volatile memory, a nonvolatile memory, a magnetic storage medium, or an optical storage medium. An operation program for causing the robot device 3 to perform spot welding work is stored in the storage 42.

The arithmetic processing device 24 includes an operation control unit 43 that transmits an operation command. The operation control unit 43 transmits an operation command for driving the robot 1 in accordance with the operation program to a robot drive part 44. The robot drive part 44 includes an electric circuit that drives the drive motors. The robot drive part 44 supplies electricity to the robot drive device 21 in accordance with the operation command. The operation control unit 43 transmits an operation command for driving the tool drive device 22 to an operation tool drive part 45. The operation tool drive part 45 includes an electric circuit for supplying electricity to the electrodes and an electric circuit for driving the motor for the movable electrode. The operation tool drive part 45 supplies electricity to the tool drive device 22 in accordance with the operation command.

The operation control unit 43 corresponds to a processor that is driven in accordance with the operation program of the robot device. The processor reads the operation program and performs a control defined in the operation program, thereby functioning as the operation control unit 43.

The robot 1 includes a state detector for detecting the position and the orientation of the robot 1. The state detector according to the present embodiment includes a rotation angle detector 23 attached to the drive motor of each drive axis of the robot drive device 21. The rotation angle detector 23 includes, for example, an encoder. The position and the orientation of the robot 1 are detected based on an output from the rotation angle detector 23.

The controller 2 includes a teach pendant 49 serving as an operation panel on which an operator manually operates the robot device 3. The teach pendant 49 includes an input part 49*a* for inputting information relating to the robot 1, the welding gun 5, and the vision sensor 30. The input part 49*a* includes an operation member such as a keyboard and a dial. The teach pendant 49 includes a display part 49*b* that displays information relating to the control of the robot device 3. The display part 49*b* includes a display panel such as a liquid crystal display panel.

A robot coordinate system 71, which does not move when the position and the orientation of the robot 1 change, is set for the robot device 3 according to the present embodiment. In the example illustrated in FIG. 1, an origin of the robot coordinate system 71 is arranged at the base 14 of the robot 1. The robot coordinate system 71 is also referred to as a world coordinate system or a reference coordinate system. In the robot coordinate system 71, a position of the origin is fixed and orientations of coordinate axes are also fixed. Even when the position and the orientation of the robot 1 change, a position and an orientation of the robot coordinate system 71 do not change.

For the robot device 3, a tool coordinate system 72 is set with an origin thereof set at any position of the operation tool. A position and an orientation of the tool coordinate system 72 change together with the position and the orientation of the welding gun 5. In the present embodiment, the origin of the tool coordinate system 72 is set at a tool center point (a leading end point of the fixed electrode). The position of the robot 1 corresponds to a position of the tool center point (the position of the origin of the tool coordinate system 72). The orientation of the robot 1 corresponds to the orientation of the tool coordinate system 72 with respect to the robot coordinate system 71.

The vision sensor 30 according to the present embodiment is a three-dimensional camera that can acquire three-dimensional position information on a surface of an object. The vision sensor 30 according to the present embodiment is a stereo camera including a first camera 31 and a second camera 32. Each of the cameras 31 and 32 is a two-dimensional camera that can image a two-dimensional image. Relative positions of the two cameras 31 and 32 are predetermined. The vision sensor 30 according to the present embodiment includes a projector 33 that projects, toward the surface 65*b* of the workpiece 65, light having a pattern such as a stripe pattern.

The first simulation device 4 simulates an operation of the robot device 3. The simulation device 4 arranges a three-dimensional model of the robot 1, a three-dimensional model of the welding gun 5, and three-dimensional models of the workpieces 65 and 66 in the same virtual space and simulates the operation of the robot device 3.

The simulation device 4 according to the present embodiment includes an arithmetic processing device including a CPU serving as a processor. The simulation device 4 includes a storage 53 that stores any information relating to the simulation of the robot device 3. The storage 53 can include a non-transitory storage medium that can store information. For example, the storage 53 can include a storage medium such as a volatile memory, a nonvolatile memory, a magnetic storage medium, or an optical storage medium. A program for performing the simulation of the robot device is stored in the storage 53.

Three-dimensional shape data 50 of the robot 1, the welding gun 5, and the workpieces 65 and 66 is input to the simulation device 4. The three-dimensional shape data 50 includes three-dimensional shape data of the robot, the operation tool, the peripheral device, and the workpiece for performing the simulation of the robot device. Data output from, for example, a computer-aided design (CAD) device may be used as the three-dimensional shape data 50. The three-dimensional shape data 50 is stored in the storage 53.

The simulation device 4 includes an input part 51 for inputting information relating to the simulation of the robot device 3. The input part 51 includes an operation member such as a keyboard, a mouse, and a dial. The simulation device 4 includes a display part 52 that displays the information relating to the simulation of the robot device 3. As will be described later, the display part 52 displays an image of a model of the robot device 3 and an image of models of the workpieces 65 and 66. The display part 52 includes a display panel such as a liquid crystal display panel. When the simulation device includes a display panel of a touch panel type, the display panel functions as the input part and the display part.

The simulation device 4 includes a processing unit 54 that performs arithmetic processing for the simulation of the robot device 3. The processing unit 54 has a function of processing information acquired by the vision sensor 30.

The processing unit 54 includes a model generating unit 55 that generates a robot device model which is a model of the robot device and a workpiece model which is a model of the workpiece, based on the three-dimensional shape data 50 including the three-dimensional shape data of the robot device 3 and the three-dimensional shape data of the workpieces 65 and 66.

The processing unit 54 includes a simulation executing unit 56 that performs the simulation of the operation of the robot device 3. The simulation executing unit 56 has a function of moving the robot device model on a screen in accordance with an operation of the input part 51 by the operator. Alternatively, the simulation executing unit 56 performs the simulation of the operation of the robot device 3 based on a teaching point generated in advance. For example, the simulation executing unit 56 performs the simulation of the operation of the robot device 3 in accordance with an operation program 41 including the teaching point.

The processing unit 54 includes a position information generating unit 59 that generates three-dimensional position information on the surface of the workpiece 65 based on an output of the vision sensor 30 that has imaged the actual workpieces 65 and 66. The processing unit 54 includes an operation information setting unit 57 that sets operation information defined in the operation program 41 of the robot device 3, based on the simulation of the operation of the robot device 3. The operation information setting unit 57 generates an operation program including a teaching point. The operation information of the robot device 3 includes a position of the teaching point and an orientation of the robot 1 at the teaching point.

The processing unit 54 includes a display control unit 58 that controls an image displayed on the display part 52. The processing unit 54 includes a distance calculating unit 60 that calculates a distance between any two points by specifying the two point on an image displayed on the display part 52. The distance calculating unit 60 can calculate a distance between a point on an image of the workpiece model and one three-dimensional point included in a point group of three-dimensional points arranged on the surface of the workpiece.

The processing unit 54 corresponds to a processor that is driven in accordance with a program for simulation. The program for simulation is created in advance and stored in the storage 53. The processor reads the program for simulation and performs a control defined in the program, thereby functioning as the processing unit 54. The model generating unit 55, the simulation executing unit 56, the operation information setting unit 57, the display control unit 58, the position information generating unit 59, and the distance calculating unit 60 included in the processing unit 54 correspond to a processor that is driven in accordance with the program for simulation. The processor performs controls defined in the programs, thereby functioning as the respective units.

Figure 3:
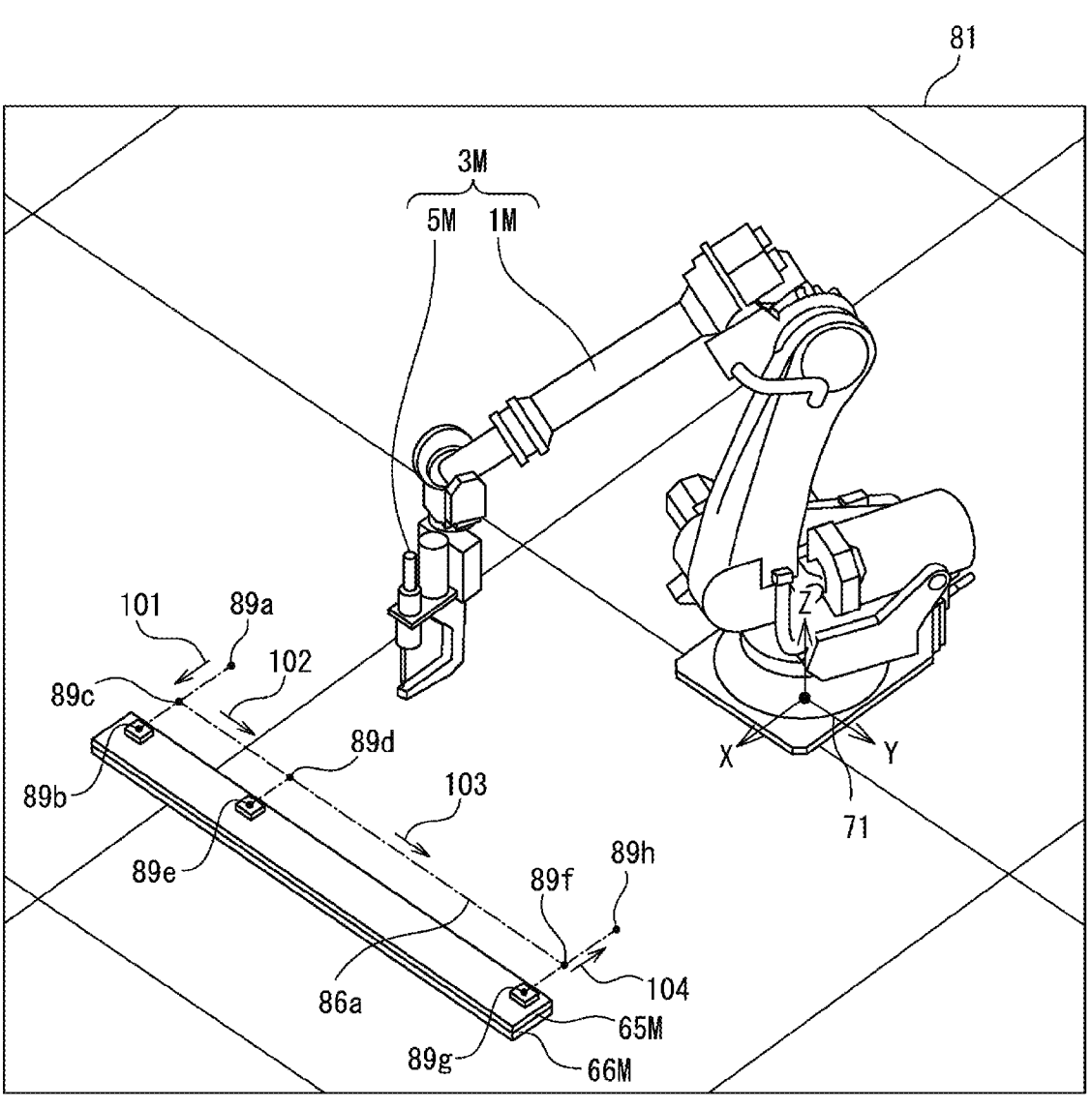
FIG. 3 is an image obtained when simulation is performed by an operation program.

FIG. 3 illustrates an example of an image displayed on the display part of the simulation device. An image 81 illustrates a state after the simulation of the robot device 3 is performed. The model generating unit 55 generates a three-dimensional model. The model generating unit 55 generates a robot device model 3M. The model generating unit 55 generates a robot model 1M based on the three-dimensional shape data of the robot 1. The model generating unit 55 generates a welding gun model 5M based on the three-dimensional shape data of the welding gun 5. The model generating unit 55 generates workpiece models 65M and 66M based on the three-dimensional shape data of the workpieces 65 and 66.

The display control unit 58 displays images of the robot model 1M, the welding gun model 5M, and the workpiece models 65M and 66M. The processing unit 54 can set the robot coordinate system 71, which has been set for the actual robot device 3, in a virtual space in which the robot device model 3M and the workpiece models 65M and 66M are arranged. As in the case of the actual robot device 3, the robot coordinate system 71 can be used to specify a position and an orientation of the robot and a position and an orientation of the workpieces in the simulation.

The operator can input, through the input part 51, design values of an installation position where the robot 1 is installed and positions where the workpieces 65 and 66 are arranged. Alternatively, the installation position of the robot 1 and the positions of the workpieces 65 and 66 may be included in the three-dimensional shape data 50. In such a situation, an installation position of a platform and positions of the workpieces with respect to the platform may be input as the positions of the workpieces.

The simulation executing unit 56 changes a position and an orientation of the robot model 1M in the image 81 in accordance with an operation on the input part 51. The operator operates the input part 51 so as to set the welding gun model 5M at a desired position and in a desired orientation. The operator specifies teaching points 89a to 89h for performing welding work. At each of the teaching points 89a to 89h, the position and the orientation of the robot model 1M are adjusted. In the present case, spot welding is performed at three locations. The teaching points 89b, 89e, and 89g correspond to the welding points 68a, 68b, and 68c at which the spot welding is performed.

As indicated by an arrow 101, the operator sets the teaching points 89a and 89b such that the welding gun model 5M moves toward a point at which a first stage of the spot welding is performed. As indicated by an arrow 102, the operator sets the teaching points 89c, 89d, and 89e such that the welding gun model 5M moves toward a point at which a second stage of the spot welding is performed. As indicated by an arrow 103, the operator sets the teaching points 89f and 89g such that the welding gun model 5M moves toward a point at which a third stage of the spot welding is performed. As indicated by an arrow 104, the operator sets the teaching point 89h such that the welding gun model 5M moves away from the point at which the third stage of the spot welding is performed. The operator specifies a movement method of the position of the robot that moves between the teaching points 89a to 89h. In the present case, the position of the robot is specified such that the robot moves linearly between the teaching points.

The simulation executing unit 56 performs the simulation in accordance with the positions of the teaching points 89a to 89h, the orientation of the robot at each of the teaching points 89a to 89h, and the movement method of the position of the robot specified by the operator. The simulation executing unit 56 can change the position and the orientation of the robot model 1M in the image 81 based on the teaching points 89a to 89h. The simulation executing unit 56 can then estimate an operation path 86a based on a result of the simulation. The operation path 86a is a path along which the tool center point of the robot device 3 moves. The display control unit 58 displays the operation path 86a which is superimposed on the images of the robot device model 3M and the workpiece models 65M and 66M.

In this manner, the operator can operate the input part 51 to set the teaching points 89a to 89h by changing the position and the orientation of the robot model 1M in the image 81. Alternatively, the operator can create in advance the operation program 41 in which teaching points are defined and input the operation program 41 to the simulation device 4. The simulation executing unit 56 performs, based on the operation program 41, a simulation in which the robot model 1M operates, and thereby calculates the operation path 86a. The display control unit 58 can display the operation path 86a in addition to the images of the robot device model 3M and the workpiece models 65M and 66M.

The operator moves the robot device model 3M in the image 81 so as to confirm a state of the robot device. The operator can correct the positions of the teaching points and the orientations of the robot at the teaching points. When it is confirmed that the robot device model 3M is driven in a desired state, the operation information setting unit 57 sets, in the operation program, the positions of the teaching points and the orientations of the robot at the teaching points as operation information. In other words, the operation information setting unit 57 can generate the operation program.

The position of the robot model 1M and the positions of the workpiece models 65M and 66M in the virtual space are specified with design values that are desired values. For example, the operator can set the position of the robot model 1M and the positions of the workpiece models 65M and 66M to desired values by using the robot coordinate system 71.

In the present case, the actual installation position of the robot 1 and the actual positions of the workpieces 65 and 66 fixed to the platform 69 often deviate from the desired design values. As a result, the positions of the workpieces 65 and 66 with respect to the installation position of the robot 1 often deviate from desired positions. In the simulation, it is difficult to estimate the accurate positions of the workpiece models 65M and 66M with respect to the robot device model 3M. In this manner, in the simulation, errors occur in the positions where respective devices and members are arranged.

The first simulation device 4 performs a control such that the actual workpieces 65 and 66 are imaged by the vision sensor 30, and the three-dimensional position information on the surface of the workpiece 65 is displayed on a simulation image so as to correspond to the position of the actual workpiece 65. The three-dimensional position information on the surface of the workpiece 65 is displayed so that deviation of the position at which the workpiece 65 is arranged with respect to the installation position of the robot 1 can be recognized.

Figure 4:
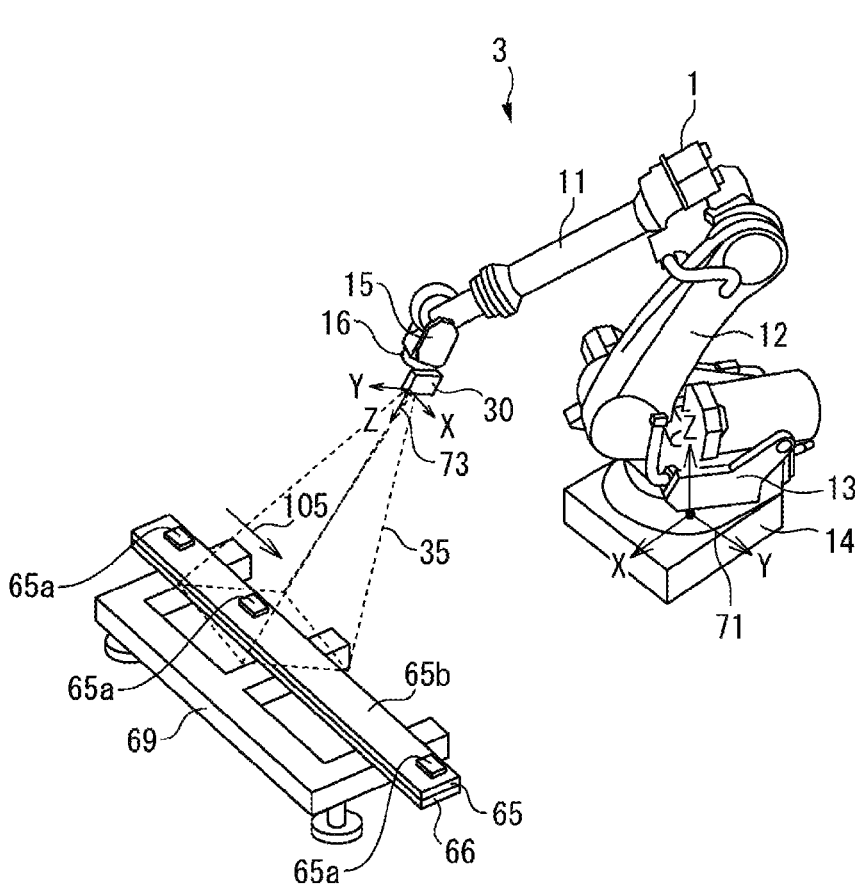
FIG. 4 is a perspective view of a robot device and a workpiece when a vision sensor images the workpiece.

FIG. 4 is a perspective view of the robot and the workpiece when the actual workpiece is being captured by using the vision sensor. Referring to FIGS. 2 and 4, in the present embodiment, the vision sensor 30 is attached to the robot 1 when an operation program is generated. When the robot device 3 actually performs spot welding, the vision sensor 30 is removed. The vision sensor 30 can be fixed to any position of the robot 1. In the present embodiment, the vision sensor 30 is fixed to the flange 16 via a support member. The vision sensor 30 is supported by the robot 1 such that a position and an orientation of the vision sensor change.

The operator fixes, to the platform 69, the workpieces 65 and 66 serving as reference. It is preferable to select workpieces having a small manufacturing error as the workpieces 65 and 66 serving as reference. The operator fixes the workpieces 65 and 66 at positions serving as reference on the platform 69. The workpieces 65 and 66 are preferably fixed such that positional errors of the workpieces 65 and 66 on the platform 69 are reduced.

In the robot device 3, a sensor coordinate system 73 is set for the vision sensor 30. The sensor coordinate system 73 is a coordinate system whose origin is fixed to any position of the vision sensor 30. A position and an orientation of the sensor coordinate system 73 change together with the position and the orientation of the vision sensor 30. The sensor coordinate system 73 according to the present embodiment is set such that a Z-axis is parallel to an optical axis of a camera included in the vision sensor 30.

The vision sensor 30 can image in an imaging range 35. In the present embodiment, the vision sensor 30 images the workpieces 65 and 66 from above the workpieces 65 and 66. The vision sensor 30 images the surface 65b of the workpiece 65 facing the vision sensor 30. The position information generating unit 59 of the processing unit 54 can set a plurality of three-dimensional points on the surface 65b of the workpiece 65 arranged in a range in which the vision sensor 30 comes into focus within the imaging range 35 based on the output of the vision sensor 30.

The position information generating unit 59 calculates a distance from the vision sensor 30 to a point on a surface of an object, based on a parallax between an image captured by the first camera 31 and an image captured by the second camera 32. This calculation is performed for an entire pixel region of the image obtained by the first camera 31 so as to obtain a distance image. For each point of the distance image, the position information generating unit 59 obtains a three-dimensional point as coordinate values in a coordinate system of choice, based on the position information on the vision sensor. In this example, the position information generating unit 59 sets a three-dimensional point in the sensor coordinate system 73.

When the position and the orientation of the robot 1 change, the position and the orientation of the sensor coordinate system 73 change. The simulation device 4 according to the present embodiment is calibrated so that coordinate values of positions of three-dimensional points in the sensor coordinate system 73 can be converted into coordinate values in the robot coordinate system 71, based on the position and the orientation of the robot 1. In other words, calibration is performed so that coordinate values of the three-dimensional points set at the surface 65b of the workpiece 65 in the robot coordinate system 71 can be calculated based on the output of the vision sensor 30.

The position information generating unit 59 can generate three-dimensional position information on a surface of an object in the form of a three-dimensional map. The three-dimensional map represents the position information on the surface of the object through a set of coordinate values (x, y, z) of three-dimensional points on the surface of the object. These coordinate values can be represented using any arbitrary coordinate system such as a sensor coordinate system or a robot coordinate system. Alternatively, the position information generating unit 59 can generate three-dimensional position information through a distance image. The distance image represents position information on a surface of an object through a two-dimensional image. In the distance image, a distance from the vision sensor 30 to each of the three-dimensional points is expressed through a depth or a color of each pixel.

The position information generating unit 59 according to the present embodiment is disposed in the processing unit 54 of the arithmetic processing device 24, but the embodiment is not limited to this configuration. The position information generating unit may be disposed inside the vision sensor. In other words, the vision sensor may include an arithmetic processing device including a processor such as a CPU, and the processor of the vision sensor may function as the position information generating unit. In this case, the vision sensor outputs three-dimensional position information.

In the present embodiment, the workpiece 65 has a shape larger than the imaging range when the vision sensor 30 is arranged at an imaging position. Since the workpiece 65 is larger than the imaging range 35 of the vision sensor 30, the entire surface 65b of the workpiece 65 cannot be captured in one imaging iteration. For this reason, in the present embodiment, the position of the vision sensor 30 is changed by changing the position and the orientation of the robot 1 so that the entire surface 65b of the workpiece 65 is imaged in a plurality of times.

As indicated by an arrow 105, the imaging is performed a plurality of times while changing a position of the imaging range 35 on the workpiece 65. At this time, the imaging is performed such that a part of the imaging range 35 in a previous imaging iteration and a part of the imaging range 35 in a current imaging iteration overlap with each other. In other words, the imaging is performed while gradually shifting the position of the imaging range 35 so that the same portion of the workpiece 65 is imaged in the previous imaging iteration and the current imaging iteration. Three-dimensional position information acquired by the previous imaging iteration and three-dimensional position information acquired by the current imaging iteration include a common portion.

The position information generating unit 59 combines a plurality of pieces of three-dimensional position information acquired through the output of the vision sensor 30 such that common portions of the plurality of pieces of three-dimensional position information overlap with each other. The position information generating unit 59 generates three-dimensional position information on the entire surface 65b of the workpiece 65. In particular, the position information generating unit 59 generates three-dimensional position information on the surface 65b that can be viewed from the vision sensor 30. By performing this control, the three-dimensional position information on the entire workpiece 65 can be acquired by using the vision sensor 30 whose imaging range is smaller than the size of the workpiece.

As for the movement of the vision sensor, an operation program of the robot device can be created in advance for imaging so that the robot can be automatically driven to perform the imaging a plurality of times. Alternatively, the operator may perform the imaging a plurality of times while manually changing the position and the orientation of the robot. For example, the operator can change the position and the orientation of the robot by operating the teach pendant. Alternatively, as in direct teaching, a force sensor may be attached to the robot to perform a control for changing the position and the orientation of the robot so as to track an external force applied to the robot. The operator may directly push or pull the robot so as to change the position and the orientation of the robot via the force sensor.

Figure 5:
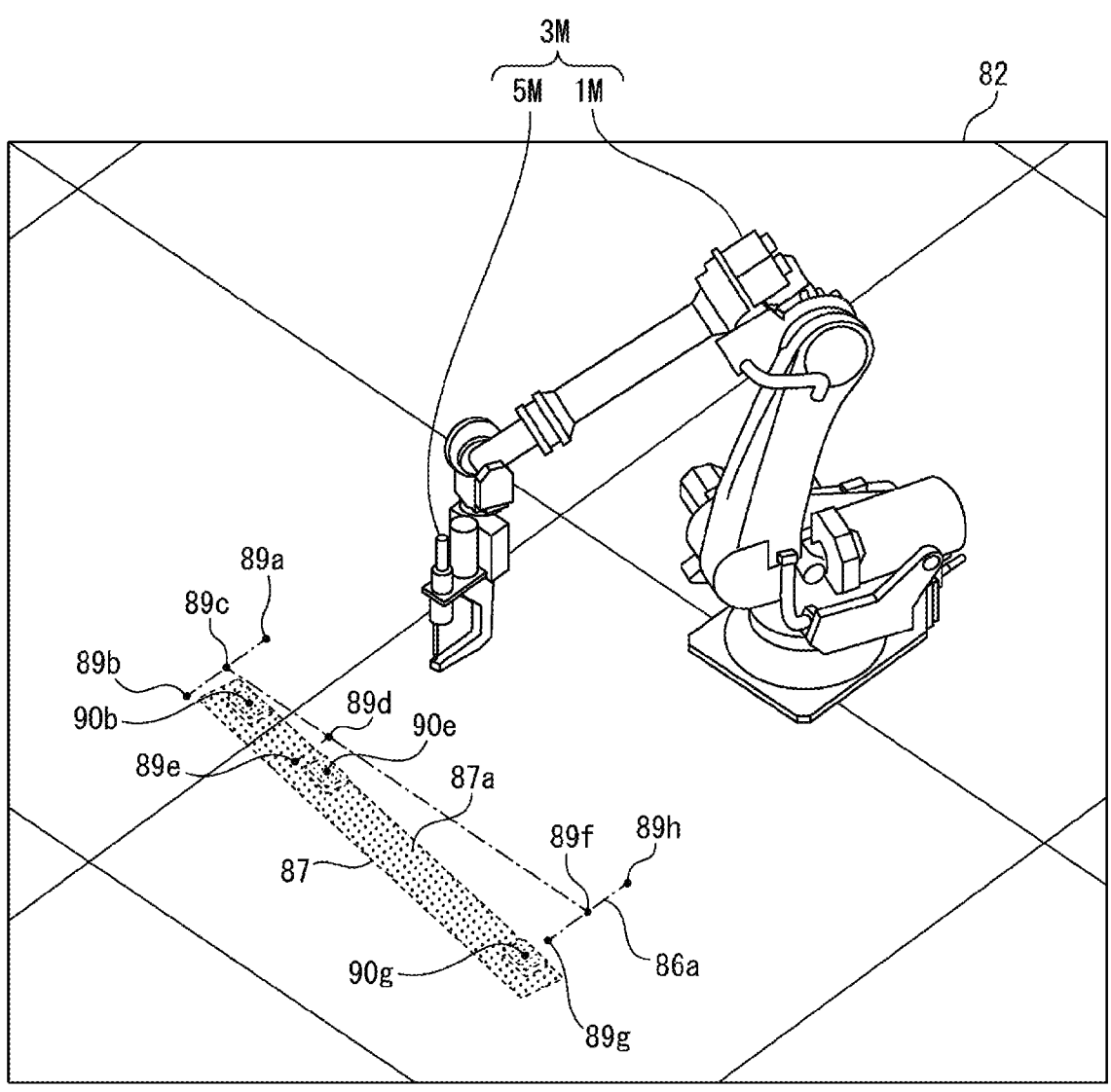
FIG. 5 is an image illustrating a robot device model and a point group of three-dimensional points detected by the vision sensor.

FIG. 5 illustrates an image of a point group of three-dimensional points as three-dimensional position information acquired by the vision sensor. The display control unit 58 displays the three-dimensional position information on the surface 65b of the workpiece 65 as three-dimensional points 87a. In an image 82, in addition to the plurality of three-dimensional points 87a, a point group 87 of three-dimensional points is indicated by a broken line such that the point group 87 surrounds the three-dimensional points 87a. The display control unit 58 can display the three-dimensional points 87a based on coordinate values of the three-dimensional points 87a acquired by the position information generating unit 59. The three-dimensional points 87a correspond to the position of the surface 65b of the actual workpiece 65. The three-dimensional points 87a are located at actual relative positions with respect to the robot.

In this example, the display control unit 58 displays the operation path 86a calculated in the simulation. It can be understood that the operation path 86a deviates from the position of the point group 87 corresponding to the surface 65b of the workpiece 65. The operator can correct the position of each of the teaching points 89a to 89h and the orientation of the robot at each of the teaching points 89a to 89h so as to correspond to a position and an orientation of the point group 87. The operator can operate the input part 51 so as to correct the teaching points while changing the position and the orientation of the robot model 1M.

For example, the operator can operate the input part 51 so as to correct the teaching point 89b corresponding to the welding point 68a to a teaching point 90b. The teaching point 89e corresponding to the welding point 68b can be corrected to a teaching point 90e. The teaching point 89g corresponding to the welding point 68c can be corrected to a teaching point 90g. The other teaching points 89a, 89c, 89d, 89f, and 89h can also be corrected in accordance with the position and the orientation of the point group 87.

As described above, the simulation device according to the present embodiment can display the three-dimensional position information on the actual workpiece which is superimposed on the images of the robot model and the workpiece model displayed in the simulation. Thus, deviation of the teaching points set to the actual workpiece can be easily confirmed. The positions of the teaching points and the orientations of the robot at the teaching points can then be corrected by using the simulation device.

The operation information setting unit 57 can correct the operation information in the operation program 41. In other words, the operation information setting unit 57 can correct the positions of the teaching points and the orientations of the robot at the teaching points. In this manner, the operation information setting unit 57 can correct the operation program based on the corrected teaching points.

In addition to the correction of the teaching points in the operation program, the operator may correct the installation position of the actual robot, the installation position of the peripheral device supporting the workpiece, or the position of the workpiece in the peripheral device. For example, the operator may correct the installation position of the platform 69 to which the workpieces 65 and 66 are fixed, or reference positions of the workpieces 65 and 66 on the platform 69.

Figure 6:
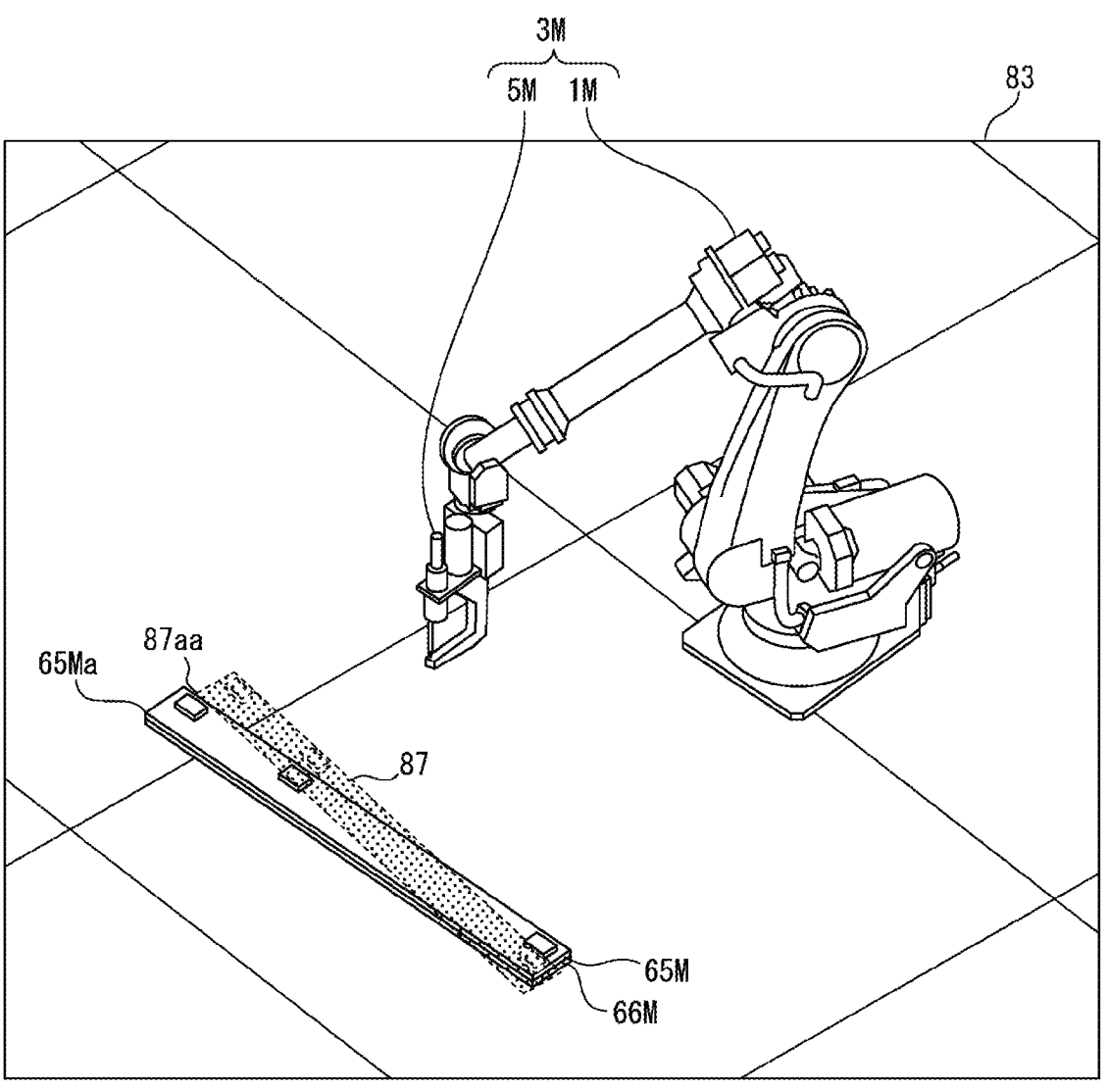
FIG. 6 is an image illustrating the robot device model, a workpiece model, and a point group of three-dimensional points detected by a vision sensor.

FIG. 6 illustrates an image of the robot device model, the workpiece model, and the point group of three-dimensional points according to the present embodiment. The operator can select information to be displayed on the display part 52 from among a model of a robot or the like, an operation path, and three-dimensional position information. In an image 83, the robot device model 3M, the point group 87 of the three-dimensional points 87a, and the workpiece models 65M and 66M are displayed through the operation of the operator.

The distance calculating unit 60 of the processing unit 54 can calculate an actual distance between any point on the workpiece models 65M and 66M and one three-dimensional point 87a included in the simulation image. In this example, the operator specifies a point 65Ma at a corner of the surface of the workpiece model 65M and a three-dimensional point 87aa arranged at a corner of the point group 87. The point 65Ma and the three-dimensional point 87aa correspond to each other. The point 65Ma and the three-dimensional point 87aa are points corresponding to a corner of the surface 65b of the workpiece 65.

The distance calculating unit 60 acquires coordinate values of the point 65Ma and coordinate values of the three-dimensional point 87aa. For example, the coordinate values in the robot coordinate system 71 are acquired. The distance calculating unit 60 then calculates a distance between the point 65Ma and the three-dimensional point 87aa. The display control unit 58 can display the distance calculated by the distance calculating unit 60 in the image 83. In this manner, the distance calculating unit 60 can calculate and display the distance between any point on the model and any point in the three-dimensional position information. The operator can acquire a distance between any two points in the simulation. For example, the operator can know how much a position of the workpiece model with respect to the robot model deviates from a position of the workpiece with respect to the actual robot.

The position information generating unit in the above-described embodiment can acquire the three-dimensional points of the surface of the platform and the installation surface which can be seen from the vision sensor. In the present embodiment, the position information generating unit excludes three-dimensional points set at the surface of the platform and the installation surface from three-dimensional points on a surface of an object. For example, the position information generating unit can select a three-dimensional point to be arranged at the surface of the workpiece based on a determination value of a distance from the vision sensor.

Three-dimensional points displayed on the display part are not limited to this configuration. For example, three-dimensional points arranged at the surface of the platform may be displayed in the simulation image. In other words, three-dimensional points set at the surface of the peripheral device of the robot may be displayed in the simulation image.

In the above-described embodiment, three-dimensional position information on an upper surface of the workpiece 65 is acquired, but the embodiment is not limited to this. By changing the position and the orientation of the robot 1, the workpieces 65 and 66 can be imaged from various directions to acquire three-dimensional position information on a surface. For example, positions of three-dimensional points set at side surfaces of the workpieces 65 and 66 may be acquired. The display control unit 58 may then display the three-dimensional points set at the side surfaces of the workpieces 65 and 66 on the display part.

In the above-described embodiment, since the workpiece is larger than the imaging range of the vision sensor, imaging is performed a plurality of times while changing the position and the orientation of the robot, but the embodiment is not limited to this. When the workpiece is smaller than the imaging range, the entire workpiece can be imaged by the vision sensor in one imaging iteration. In this case, the vision sensor may be fixed to a platform or the like. For example, the vision sensor may be fixed above the workpiece, and three-dimensional position information on the entire upper surface of the workpiece may be acquired in one imaging iteration.

Figure 7:
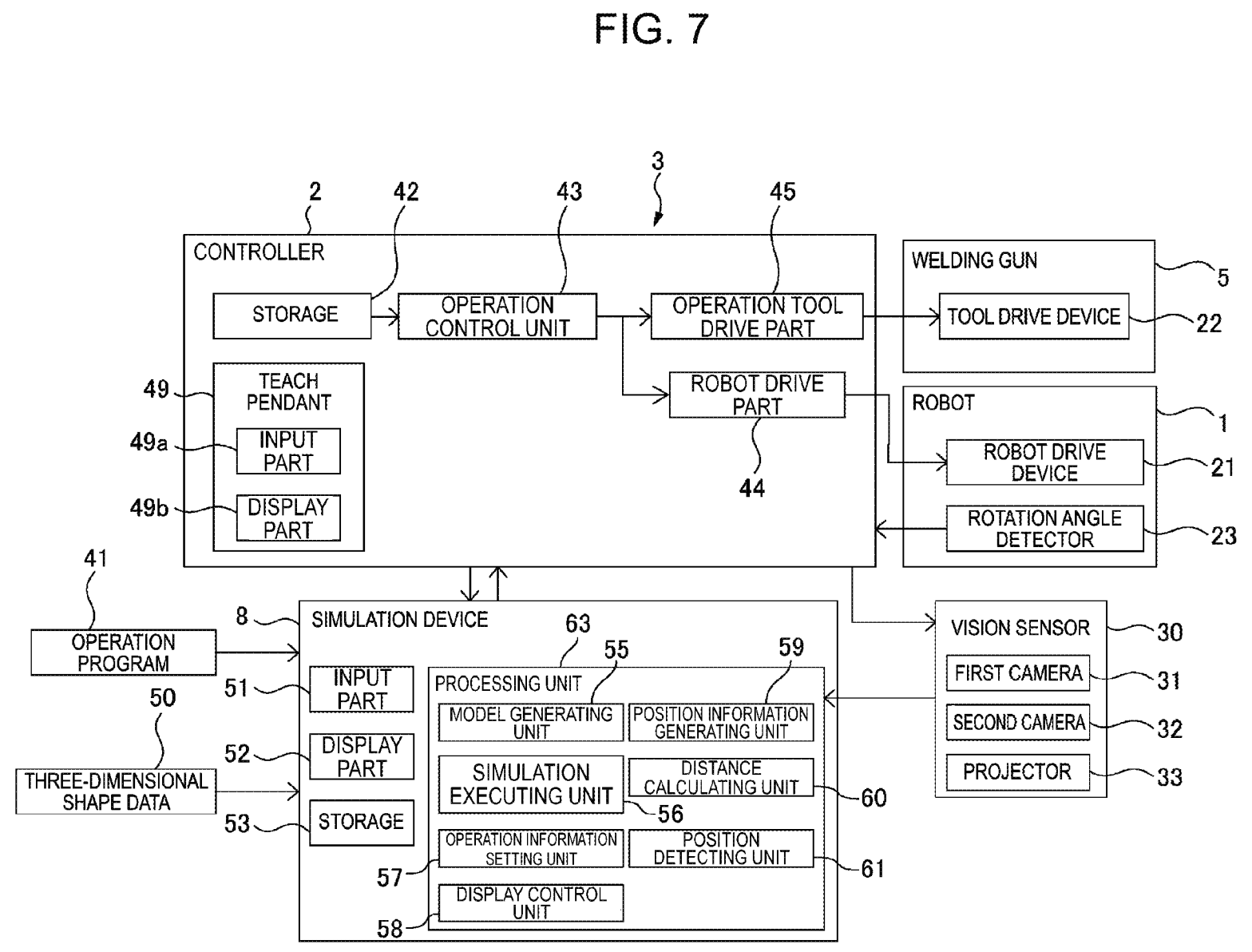

FIG. 7 illustrates a block diagram of a second robot system according to the present embodiment. The second robot system includes the first robot device 3 and a second simulation device 8. The second simulation device 8 detects the position of the actual workpiece based on the three-dimensional position information acquired from the output of the vision sensor 30. The second simulation device 8 then automatically corrects operation information included in an operation program so as to correspond to the position of the actual workpiece.

In the second simulation device 8, the configuration of a processing unit 63 is different from the configuration of the processing unit 54 of the first simulation device 4. The processing unit 63 of the second simulation device 8 includes a position detecting unit 61 that detects the position of the actual workpiece by matching reference data of the workpiece with the three-dimensional position information on the surface of the workpiece. The position detecting unit 61 corresponds to a processor that is driven in accordance with a program for simulation. The processor performs a control defined in the program, thereby functioning as the position detecting unit 61.

The operation information setting unit 57 corrects the operation information including information of the teaching points in the operation program. Based on the position of the workpiece model in the simulation and the position of the actual workpiece detected by the position detecting unit 61, the operation information setting unit 57 corrects the operation information so as to correspond to the position of the actual workpiece.

Figure 8:
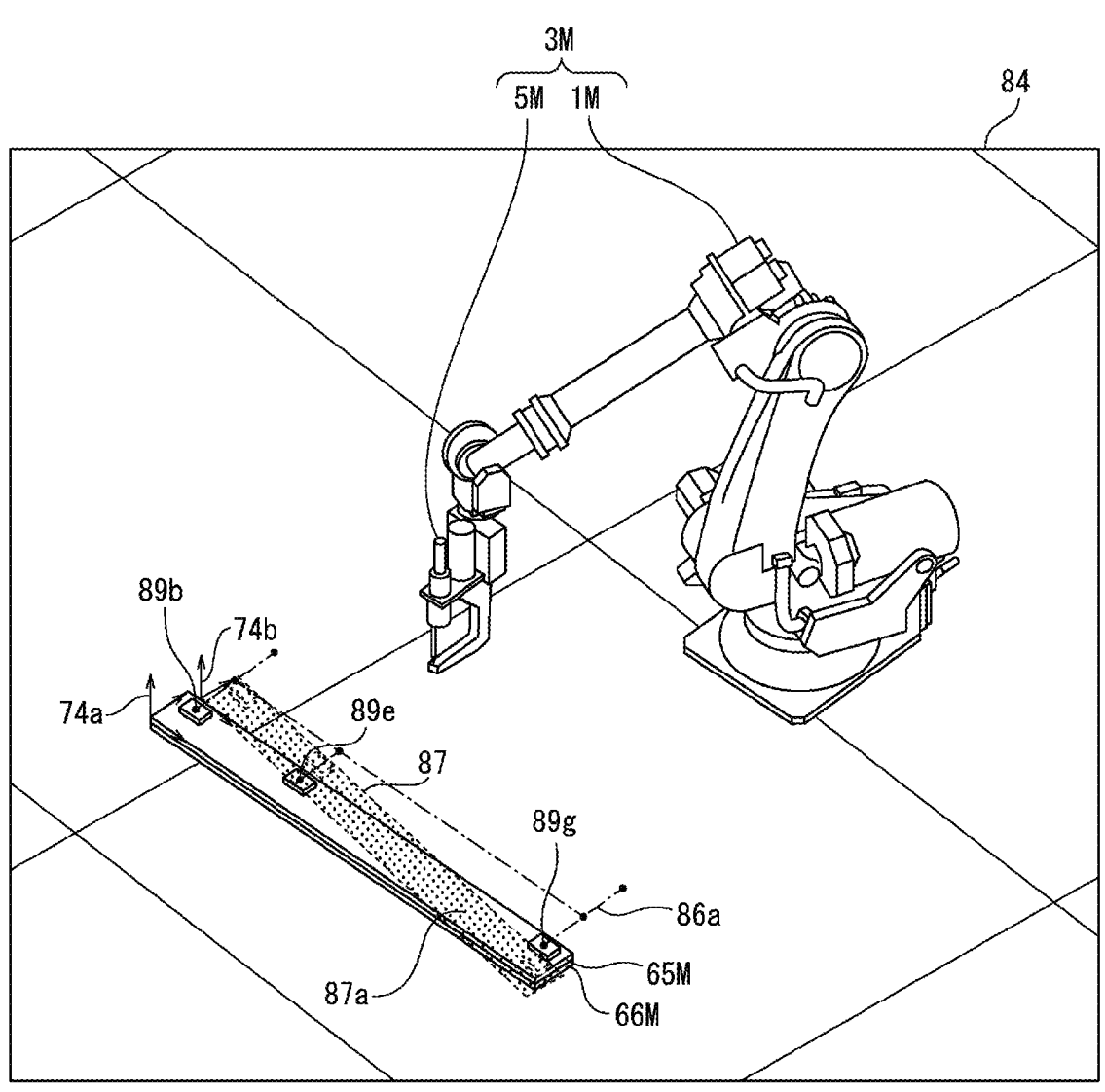
FIG. 8 is an image illustrating the robot device model, the workpiece model, and a point group of three-dimensional points, for explaining a workpiece coordinate system set for the workpiece model.

FIG. 8 illustrates an image of a point group of three-dimensional points acquired from the output of the vision sensor. Referring to FIGS. 7 and 8, in an image 84, by imaging the workpieces 65 and 66 with the vision sensor 30, the point group 87 of the three-dimensional points 87a is displayed as three-dimensional position information. In the image 84, the robot device model 3M, the workpiece models 65M and 66M, the point group 87 of the three-dimensional points 87a, and the operation path 86a are displayed. The operation path 86a is a path generated in the simulation based on the positions of the workpiece models 65M and 66M. The point group 87 corresponding to the position of the surface 65b of the actual workpiece 65 is shifted from the upper surface of the workpiece model 65M. As a result, the operation path 86a is also shifted from the position of the point group 87 including the three-dimensional points 87a.

The position detecting unit 61 detects the position of the actual workpiece corresponding to the point group 87 by matching the point group 87 with the reference data of the workpiece 65. In the matching, three-dimensional shape data of the workpiece output from a CAD device or the like can be used as the reference data of the workpiece.

As the matching, for example, the position detecting unit 61 generates information of a plurality of meshes based on a large number of three-dimensional points 87a. The actual position of the workpiece may be detected by matching mesh information generated based on the three-dimensional shape data of the workpiece with the information of the plurality of meshes.

Alternatively, the matching of three-dimensional shape data of a feature portion with a point group of three-dimensional points can be performed after selecting the feature portion having a distinctive shape in the workpiece. The position of the feature portion can be detected by specifying the feature portion in the point group of the three-dimensional points. The position of the actual workpiece can be detected based on positions of a plurality of feature portions. For example, the protrusions 65a of the workpiece 65 are selected as feature portions. By matching the point group of the three-dimensional points with three-dimensional shape data of the protrusions 65a as reference data, positions of a plurality of protrusions in the point group can be specified. Alternatively, a contour of the workpiece may be estimated based on the point group of the three-dimensional points, to match with a contour in the three-dimensional shape data of the workpiece.

In the present embodiment, in order to determine the position and the orientation of the workpiece, a coordinate system (user coordinate system) having an origin on the surface of the workpiece and having a predetermined orientation with respect to the workpiece is set in advance. In the present embodiment, this coordinate system is referred to as a workpiece coordinate system. The workpiece coordinate system is a coordinate system fixed to the workpiece.

A workpiece coordinate system 74a is set on the upper surface of the workpiece model 65M. In the present embodiment, the origin of the workpiece coordinate system is arranged at one corner of the surface 65b of the workpiece 65. An X-axis and a Y-axis of the workpiece coordinate system are set along respective directions in which edges of the surface 65b extend. For example, the position of the workpiece corresponds to a position of the origin of the workpiece coordinate system, and can be represented by coordinate values (x, y, z) in the robot coordinate system 71. The orientation of the workpiece corresponds to an orientation of the workpiece coordinate system, and can be represented by the coordinate values (w, p, r) in the robot coordinate system 71.

The operation information defined in the operation program can be specified by the position and the orientation of the workpiece coordinate system represented in the robot coordinate system, and the position of the teaching points and the orientation of the robot at each of the teaching points represented in the workpiece coordinate system.

The position detecting unit 61 detects the position of the workpiece 65 corresponding to the point group 87 by matching the point group 87 including the three-dimensional points 87a with the reference data of the workpiece. The position detecting unit 61 calculates a point corresponding to a corner of the upper surface of the workpiece, and sets a workpiece coordinate system 74b such that the point is the origin. The workpiece coordinate system 74b is set such that an X-axis and a Y-axis thereof extend along respective edges of the point group 87. A position and an orientation of the workpiece coordinate system 74b corresponding to the position and orientation of the actual workpiece 65 can be calculated in the robot coordinate system 71. The display control unit 58 can display the workpiece coordinate system 74b set by the position detecting unit 61.

In the operation program, the operation information setting unit 57 performs a control for correcting a position and an orientation of the workpiece coordinate system 74a set for the workpiece model 65M in the simulation so as to correspond to the position and the orientation of the workpiece coordinate system 74b calculated based on the point group 87 including the three-dimensional points 87a. In this manner, the operation information setting unit 57 can correct the operation information in the operation program. In this case, the position and the orientation of the workpiece coordinate system included in the operation information can be corrected.

Figure 9:
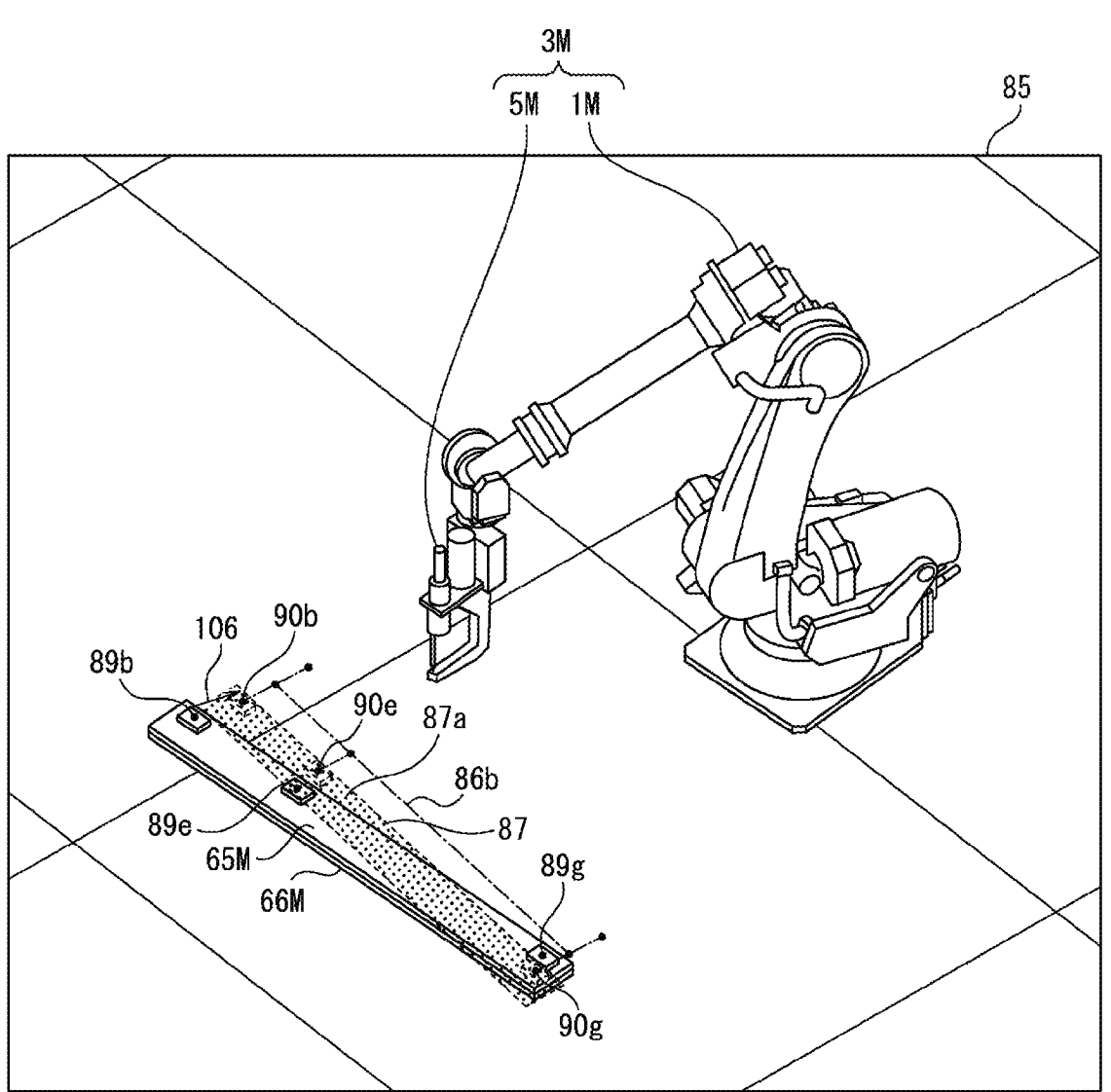
FIG. 9 is an image illustrating an operation path after operation information in an operation program is corrected, the robot device model, the workpiece model, and a point group of three-dimensional points.

FIG. 9 illustrates an image of the operation path, the robot model, the workpiece model, and the point group of the three-dimensional points after the operation information is corrected in the operation program. By correcting the position and the orientation of the workpiece coordinate system as the operation information, the position of each of the teaching points and the orientation of the robot at each of the teaching points are corrected. The respective teaching points 89b, 89e, and 89g are moved as indicated by an arrow 106, and corrected teaching points 90b, 90e, and 90g are set. When the simulation executing unit 56 performs the simulation, a corrected operation path 86b is displayed.

In the second simulation device, deviations of relative positions and relative orientations of the workpieces 65 and 66 with respect to the robot 1 can be automatically corrected. More specifically, the operation information included in the operation program can be automatically corrected so as to correspond to the position of the actual workpiece based on the three-dimensional position information acquired from the output of the vision sensor.

By setting the workpiece coordinate system on the surface of the workpiece and determining the position of each of the teaching points and the orientation of the robot at each of the teaching points in the workpiece coordinate system, the control for correcting the operation program can be simplified. In the operation program, the operation information can be corrected by changing the position and the orientation of the workpiece coordinate system without needing to change the position of each of the teaching points and the orientation of the robot at each of the teaching points represented in the workpiece coordinate system.

In the above-described embodiment, the operation information setting unit performs a control to correct the position and the orientation of the workpiece coordinate system in the operation program, but the embodiment is not limited to this. The operation information setting unit can correct the operation information in the operation program through any control.

For example, the position of each of the teaching points and the orientation of the robot at each of the teaching points serving as the operation information defined in the operation program can be specified through coordinate values in the robot coordinate system. In this case, the operation information setting unit calculates the relative position and the relative orientation of the workpiece coordinate system set for the point group of the three-dimensional points with respect to the workpiece coordinate system set for the workpiece model. A movement direction and a movement amount of the workpiece coordinate system correspond to an error in the position and the orientation of the workpiece. For this reason, the operation information setting unit can correct the position of each of the teaching points and the orientation of the robot at each of the teaching points represented in the robot coordinate system based on the relative position and the relative orientation of the workpiece coordinate system.

In such a case, the operation information setting unit 57 can have a function of converting coordinate values in one coordinate system into coordinate values in another coordinate system for one point in the simulation. For example, coordinate values of one point represented in the workpiece coordinate system set to the workpiece model can be converted into coordinate values represented in the robot coordinate system based on the position and the orientation of the robot. Alternatively, one coordinate value represented in the robot coordinate system can be converted into a coordinate value represented in the workpiece coordinate system. Alternatively, coordinate values in the sensor coordinate system may be converted into coordinate values in the robot coordinate system based on the position and the orientation of the robot.

In the above-described embodiment, the welding gun is attached to the robot as an operation tool, but the embodiment is not limited to this. Any operation tool can be employed depending on an operation performed by a robot device. The simulation device according to the present embodiment can be applied to a robot device that performs any work. Next, an example of a robot device that performs the operation other than spot welding will be described.

Figure 10:
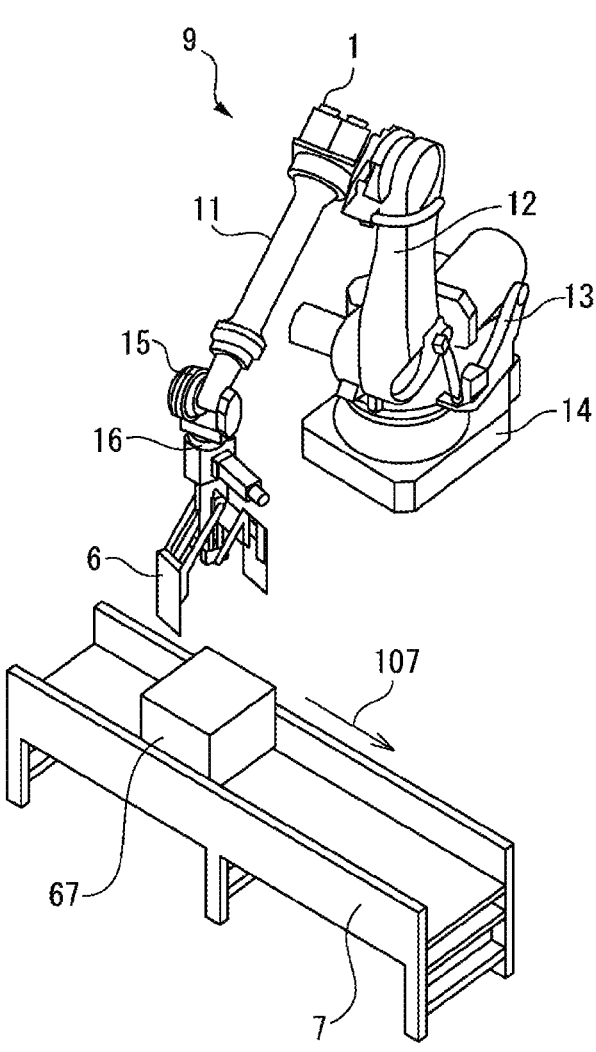
FIG. 10 is a perspective view of a second robot device according to an embodiment.

FIG. 10 illustrates a perspective view of a second robot device according to the present embodiment. A second robot device 9 includes a hand 6 as an operation tool attached to the robot 1. The hand 6 is formed to be capable of holding and releasing a workpiece 67. The second robot device 9 includes, as a peripheral device of the robot 1, a conveyor 7 that transports the workpiece 67. The conveyor 7 transports the workpiece 67 in a direction indicated by an arrow 107. The second robot device 9 performs work to transport the workpiece 67 from a predetermined position and place the workpiece 67 on the conveyor 7.

Also in the second robot device 9, errors in an installation position of the robot 1 and an installation position of the conveyor 7 may occur. Also, in a simulation device of the second robot device 9, the workpiece 67 serving as reference is placed at a reference position of the conveyor 7. Three-dimensional position information on a surface of the workpiece is acquired by imaging the workpiece with a vision sensor attached to a robot or the like. In the simulation device, three-dimensional position information can be displayed in addition to an image of a robot device model, a workpiece model, and the like. The operator can correct operation information of an operation program in the simulation device. The simulation device can correct the operation information included in the operation program based on the three-dimensional position information acquired from the output of the vision sensor. For example, a teaching point at which the robot device releases the workpiece on the conveyor can be corrected.

The vision sensor according to the present embodiment is a stereo camera including a plurality of two-dimensional cameras, but the embodiment is not limited to this. As the vision sensor, any sensor that can acquire three-dimensional position information on a surface of an object can be employed. As the vision sensor, for example, a time-of-flight (TOF) camera that acquires position information on a three-dimensional point based on time-of-flight of light. Alternatively, as the vision sensor, a device that detects a position of a surface of an object by scanning a predetermined region with a laser range finder may be employed.

The processing unit of the simulation device according to the present embodiment is formed by an arithmetic processing device other than the robot controller, but the embodiment is not limited to this. The robot controller may have the function of the simulation device. In other words, a processor of the arithmetic processing device of the controller may function as the processing unit. When the teach pendant includes an arithmetic processing device having a processor, the teach pendant may have the function of the simulation device. In other words, the processor of the teach pendant may function as the processing unit.

The above-described embodiments can be suitably combined. In each of the above-described controls, the order of steps can be changed appropriately to the extent that functions and effects are not changed. In each of the above drawings, the same or similar parts are denoted by the same reference numerals. It should be noted that the above-described embodiments are examples and do not limit the invention. The embodiments include modifications of the embodiments described in the claims.

REFERENCE SIGNS LIST

1 robot
1M robot model
3, 9 robot device
3M robot device model
4, 8 simulation device
30 vision sensor
35 imaging range
50 three-dimensional shape data
52 display part
54, 63 processing unit
55 model generating unit
56 simulation executing unit
57 operation information setting unit
59 position information generating unit
60 distance calculating unit
61 position detecting unit
65, 66, 67 workpiece
65M, 66M workpiece model
65$b$ surface
71 robot coordinate system
73 sensor coordinate system
74$a$, 74$b$ workpiece coordinate system
81 to 84 image
86$a$, 86$b$ operation path
87 point group
87$a$, 87$aa$ three-dimensional point
89$a$ to 89$h$ teaching point
90$b$, 90$e$, 90$g$ teaching point

The invention claimed is:

1. A simulator configured to perform a simulation of an operation of a robot device including a robot, comprising:

at least one processor; and a display configured to display an image of a robot device model and an image of a workpiece model; wherein the at least one processor is configured to generate the robot device model and the workpiece model for the simulation based on three-dimensional shape data of the robot device and three-dimensional shape data of a workpiece, generate an operation program including a teaching point, perform the simulation of the operation of the robot device based on the teaching point, estimate an operation path of the robot, generate a point group of three-dimensional points and three-dimensional position information including information on positions of three-dimensional points in the point group of three-dimensional points on a surface of the workpiece from an output of a three-dimensional camera which images the workpiece, and cause the display to display the point group of three-dimensional points on the surface of the workpiece based on the three-dimensional position information generated by the output of the three-dimensional camera, so that the point group of three-dimensional points are superimposed on the image of the robot device model, the image of the workpiece model, and the operation path of the robot and deviation of the point group of three-dimensional points to the workpiece model is shown.

2. The simulator of claim 1, wherein the at least one processor is configured to calculate a distance between a point on the workpiece model and one of the three-dimensional points.

3. The simulator of claim 1, wherein the at least one processor is configured to, in response to
the workpiece having a shape larger than an imaging
range when the three-dimensional camera is arranged at
an imaging position, generate a plurality of pieces of three-dimensional
position information acquired by performing imag-
ing a plurality of times while changing the imaging
position, and generate the three-dimensional position information on
the surface of the workpiece by combining the
plurality of pieces of three-dimensional position
information.

4. A simulator configured to perform a simulation of an
operation of a robot device including a robot, comprising:

at least one processor configured to generate a robot device model and a workpiece model
for the simulation based on three-dimensional shape
data of the robot device and three-dimensional shape
data of a workpiece, perform the simulation of the operation of the robot
device, set operation information which is defined in an opera-
tion program, based on the simulation of the opera-
tion of the robot device, generate a point group of three-dimensional points and
three-dimensional position information including
information on positions of three-dimensional points
in the point group of three-dimensional points on a
surface of the workpiece from an output of a three-
dimensional camera which images the workpiece, detect a position of the workpiece by matching refer-
ence data of the workpiece with the information on positions of the point group of three-dimensional
points on the surface of the workpiece, and correct the operation information included in the opera-
tion program so as to correspond to the position of
the workpiece, based on a position of the workpiece
model in the simulation and the detected position of
the workpiece, wherein the point group of three-dimensional points is set over an
entirety of the surface of the workpiece facing the
three-dimensional camera.

5. The simulator of claim 4, wherein a workpiece coordinate system having an origin set inside
or on the workpiece is predetermined, the operation information defined in the operation pro-
gram includes a position and an orientation of the workpiece coordi-
nate system, a position of a teaching point, and an orientation of the robot at the teaching point defined
in the workpiece coordinate system, and the at least one processor is configured to correct the
position and the orientation of the workpiece coordi-
nate system set for the workpiece model in the simu-
lation so as to correspond to the position and the
orientation of the workpiece coordinate system of the
workpiece which is calculated from the three-dimen-
sional position information.

6. The simulator of claim 4, wherein the at least one processor has a function of converting a
coordinate value in one coordinate system into a coor-
dinate value in another coordinate system for one point
in the simulation.

* * * * *